United States Patent [19]
Franz

[11] 3,831,841
[45] Aug. 27, 1974

[54] TEMPERATURE CONTROL SYSTEM AND VACUUM MODULATOR VALVE THEREFOR

[75] Inventor: Rudolph J. Franz, Schaumburg, Ill.

[73] Assignee: Eaton Corporation, Cleveland, Ohio

[22] Filed: Jan. 30, 1974

[21] Appl. No.: 438,507

[52] U.S. Cl.................. 236/13, 236/87, 236/101
[51] Int. Cl.. B60h 1/02, G05d 11/16, G05d 23/275
[58] Field of Search............ 237/12.3 B; 236/13, 87, 236/101; 164/42

[56] References Cited
UNITED STATES PATENTS

| | | | |
|---|---|---|---|
| 3,294,320 | 12/1966 | Franz..................... | 236/87 |
| 3,455,505 | 7/1969 | Beatenbough et al............... | 236/87 |
| 3,633,821 | 1/1972 | Austin.................... | 236/87 |

Primary Examiner—William E. Wayner
Attorney, Agent, or Firm—Teagno & Toddy

[57] ABSTRACT

Apparatus is provided for controlling a vacuum motor to regulate the position of an air blend door in an automotive air conditioning system. The apparatus includes a sensor and an aspirator spaced apart from the sensor, with the outlet of the sensor in fluid communication with the aspirated-air inlet of the aspirator. The sensor includes a valve casing, a vacuum supply line, and a vacuum control line connected to the vacuum motor. Valve means is provided within the valve casing so that the vacuum supply line and the vacuum control line are in open communication when the valve means is open. The sensor has a bimetal element mounted in the flow of air at in-car temperatures and an adjustment arm which are independent of each other, but in operative association with the valve means to effect movement thereof.

7 Claims, 7 Drawing Figures 3,831,841

TEMPERATURE CONTROL SYSTEM AND VACUUM MODULATOR VALVE THEREFOR

BACKGROUND OF THE DISCLOSURE

The present invention relates to automotive air conditioning systems and, more particularly, to temperature control systems and vacuum modulator valves for use therein.

It is well known in the air conditioning art to provide vacuum control valves for supplying a controlled amount of vacuum to various vacuum operated components of the system, such as the vacuum motor which controls the air blend door. Conventionally, the degree of vacuum in such valves has been regulated by flowing air at the temperature of the incar air over a bimetal element. Typical of such valves and systems are those disclosed in U.S. Pat. Nos. 3,455,505; 3,373,934; and 3,263,739.

It has been found desirable, for certain configurations of air conditioning systems, to separate the aspirator from the vacuum modulator valve, so that primary air, i.e. air coming from the blower, passes through the aspirator only, and not through the vacuum modulator valve. In such a set up, the aspirator may be used to pull the air at in-car temperatures through the vacuum modulator valve (also referred to as the "sensor").

SUMMARY OF THE INVENTION

Accordingly, it is an object of the present invention to provide a vacuum modulator valve for an automotive air conditioning system which is responsive to the cooperating forces exerted by an in-car bimetal element and a manual adjustment element.

It is a more specific object of the present invention to provide an improved temperature control system in which the primary air is fed into an aspirator, which aspirates air at in-car temperatures through a separate vacuum modulator valve, thus regulating the degree of vacuum.

These and other objects of the present invention, which will become apparent upon a reading of the following detailed description, are accomplished by the provision of apparatus for controlling a vacuum motor to regulate the position of an air blend door in an automotive air conditioning system. The apparatus comprises:

a. a valve casing having a vacuum chamber therein;

b. a vacuum supply line connecting said vacuum chamber to a source of vacuum;

c. a vacuum control line spaced along said chamber from said supply line;

d. a valve seat in said chamber between said supply line and said vacuum control line;

e. an air vent member extending into said vacuum chamber and having an air vent chamber therein;

f. a flexible diaphragm sealing said vacuum chamber along its periphery and being in sealing engagement with said air vent member and being capable of moving said air vent member inwardly along said vacuum chamber upon increases in vacuum;

g. said air vent member having a control member extending outwardly therefrom and an air inlet on the outside of said vacuum chamber leading into said air vent chamber;

h. a valve seat in said air vent chamber in axial alignment with said valve seat in said vacuum chamber;

i. air vent and vacuum control valves respectively seated on said air vent valve seat and said vacuum valve seat and connected for conjoint movement; and j. means for balancing vacuum in said vacuum chamber and effecting closing of said air vent and said vacuum control valves in accordance with temperature conditions within the vehicle, said balancing means comprising:

i. a bimetal element mounted on said casing in the flow of air at in-car temperatures and supported in spaced relation with respect to said casing and having control connection with said control member, ii. an adjustment arm pivotally mounted with respect to said casing having, at one end thereof, bearing engagement with said control member and, at the other end thereof, being in being engagement with an adjustable biasing means, and iii. said bimetal element and said adjustment arm having independent, operative association with said control member to effect movement of said air vent member along said vacuum chamber to balance the forces acting on said diaphragm in response to actual and desired in-car temperature conditions.

DESCRIPTION OF THE PREFERRED EMBODIMENT

Figure 1:
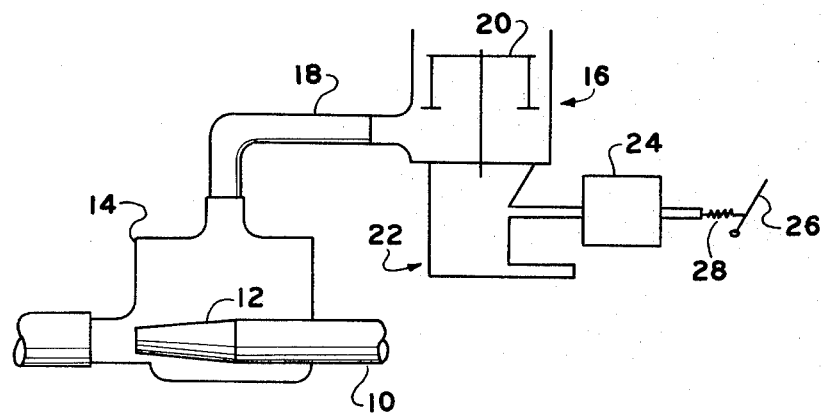
FIG. 1 is a schematic view diagrammatically illustrating the principal components of an air conditioning system constructed in accordance with the principles of the present invention.

FIG. 1 is a schematic illustrating the basic components of an automotive air conditioning system, excluding the electrical controls and other various details. A blower (not shown) forces ambient air through an air duct 10 which terminates in a tapered nozzle portion 12 inside an aspirator housing 14. The nozzle 12 and housing 14 cooperate to aspirate air at the temperature of the in-car air through the sensor or vacuum modulator valve 16, then through a duct 18, connecting the outlet of the sensor to the aspirated-air inlet of the housing 14. An in-car bimetal element 20 is positioned within the inlet of the sensor 16, and is responsive to changes in the temperature of the in-car air. The bimetal element 20 is operatively associated with a vacuum valve means 22, which supplies a preselected vacuum to a vacuum motor 24.

Vacuum motor 24 is shown as being connected to an air blend door or damper 26 through an overtravel spring 28, to control the volume of air passing along the evaporator of an air conditioner, and thereby to supply cooled air to the passenger compartment of the automotive vehicle, in order to maintain a preselected air temperature in the vehicle, as sensed and regulated by the vacuum modulator valve 16. The apparatus shown in FIG. 1 is usually mounted behind the dashboard of the vehicle to provide an accurate output in response to the cooperative forces of the manual adjustment and the in-car bimetal element.

The vacuum valve means 22 includes a valve casing 30 having a vacuum chamber 32 therein. The valve casing 30 is preferably made from metal substantially uneffected by average temperature conditions. The valve casing has an open spiderlike arm 34 forming a support for a calibrating screw 36 for the adjustment arm 38 and also forming a support for the adjustment arm 38 intermediate its ends, and a support for the in-car bimetal element 20 in the inlet through which in-car air passes into the sensor 16, as will be explained more fully below.

A vacuum supply line 40 enters the casing 30 adjacent the lower end thereof and may have connection with a source of vacuum, such as the intake manifold of the vehicle, through a suitable vacuum accumulator (not shown), as is well known to those skilled in the art. Spaced along the vacuum chamber 32 from the vacuum supply line 40 is a valve seating member 42, seated in vacuum chamber 32 adjacent the lower end thereof and suitably sealed thereto. The valve seating member 42 has a central passageway 44 extending axially through the member 42, and having its larger diameter end facing the end of the vacuum chamber 32 opposite the vacuum supply line 40 to form a seat for a vacuum control valve 46. A vacuum output 48 leads into the vacuum chamber 32 on the opposite side of the valve seating member 42 from the vacuum input 40, and is adapted to have connection to the vacuum motor 24, controlling the position of the air blend door 26 through a suitable vacuum distributor (not shown) or through a direct connection by means of a suitable vacuum line (not shown). Extending axially along the valve chamber 32 and mounted therein for axial movement with respect thereto is an air vent member 50 having an air chamber 52 extending therethrough and having a vent opening 54 outside of the vacuum chamber 32, and venting said vacuum chamber to the atmosphere to modulate the vacuum in the chamber, thereby effecting a change in position of the air blend door 26. A diaphragm 56 extends about and is sealed to the top of the vacuum chamber 32 and is sealed to and supports the air vent member 50 for axial movement along the vacuum chamber in accordance with changes in temperature conditions. A retainer 58, seated in a recessed upper face 60 of the valve casing 30, retains the peripheral portion of the diaphragm 56 in sealing engagement with the vacuum chamber 32 and may also form a guide for the air vent member 50.

The air vent chamber 52 terminates at its lower end in a seat for an air vent valve 62 having connection with the vacuum control valve 46, seated in the enlarged portion of the vacuum passageway 44, by means of a stem 64. Thus, as the air vent member 50 moves away from the valve seating member 42, the air vent valve 62 seats on its seat and moves the vacuum control valve 46 off its seat to increase the vacuum in the chamber 32 and exerts a force on the diaphragm 56 against the independent forces of the adjustment arm 38 in the in-car bimetal element 20 in a direction to reseat the valve 46 and open the air vent valve 62 to vent the vacuum chamber 32 and to reduce the vacuum therein.

The manual adjustment arm 38 is transversely pivoted intermediate its ends on a pivot pin 66 extending through a boss 68 extending upwardly from the top surface of the arm 38 and suitably mounted thereon. The pivot pin 66 extends across the aspirated air outlet duct 70, through opposite sides of the duct, and is mounted at its opposite ends on upright arms 72, formed integrally with the spider-like arm 34, and extending upwardly therefrom along opposite sides of the outlet duct 70.

In axial alignment with a control pin 74, extending upwardly from the air member 50 and formed as a part thereof, is a downwardly opening generally V-shaped recess portion 76 of the adjustment arm 38 seated on a tapered upwardly extending end 78 of the control pin 74. The top end of the tapered end 78 may be rounded to provide a uniform bearing area for the V-shaped recess portion 76 of the arm 38.

Figure 3:
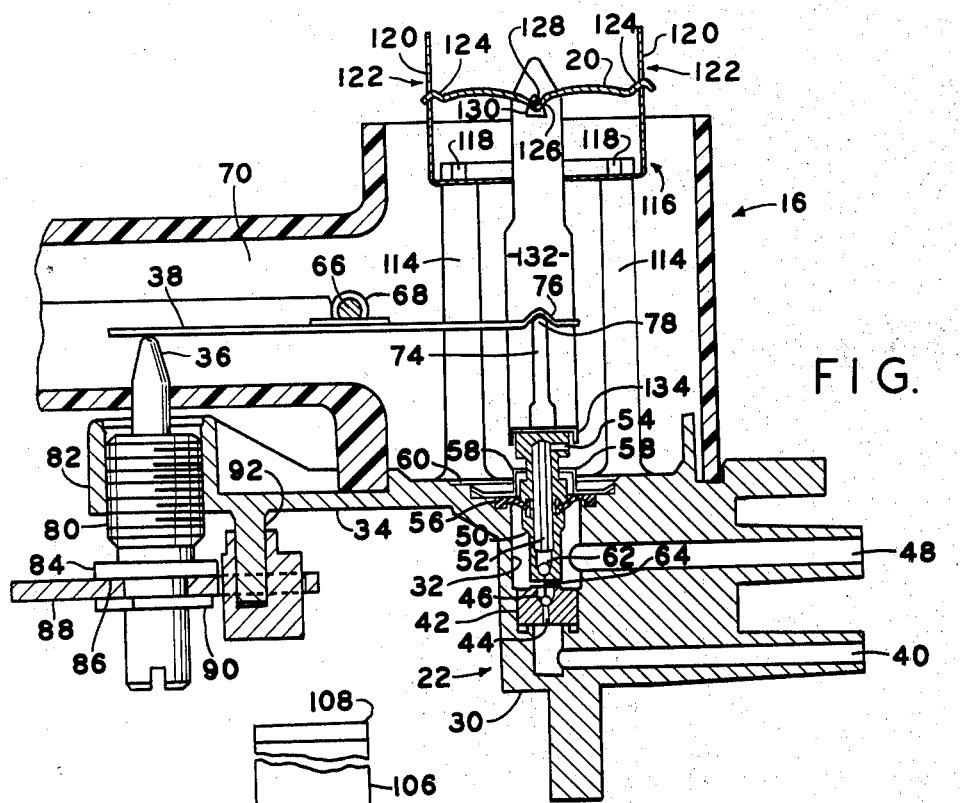
FIG. 3 is a transverse sectional view taken substantially along line 3—3 of FIG. 2.
Figure 4:
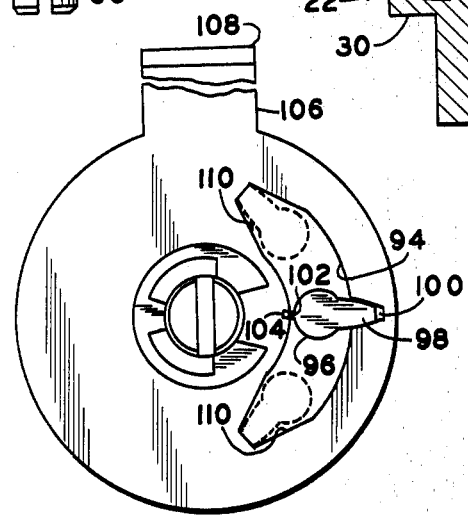
FIG. 4 is a bottom plan view showing the calibration stop.

At the opposite end of the adjustment arm 38 from the control pin 74 is the adjustment screw 36 engaging the underside of the arm 38 and loading the arm, as modulated by the bimetal element 20 to balance the vacuum in the chamber 32 in accordance with the vacuum required to provide a selected air temperature in the passenger compartment of the vehicle. The adjustment screw 36 has a tapered upper end spherical at its apex to provide a uniform bearing engagement surface with the adjustment arm 38. The adjustment screw has an enlarged-diameter intermediate portion 80, which is shown as being threaded and which may be a double-lead thread. The intermediate portion 80 is threaded in a boss 82 formed integrally with the spider-like arm 34. Beneath the enlarged portion 80 of the adjustment screw is a radial flange 84, which forms a shoulder 86 for an adjustment disc 88, retained thereto by a snap ring 90. The lower end of the adjustment screw 36 is slotted to accommodate turning of the screw by a screwdriver, to initially calibrate the screw and the adjustment arm, prior to securing the disc 88 thereto. A pin 92 extends downwardly from the spider-like arm 34 into an arcuate slot 94, formed in the disc 88. The pin is shown in FIGS. 3 and 4 as having a stop member 96 pivotally mounted thereon, which may be retained thereto for pivotable movement with respect thereto in a suitable manner. The stop member 96 has a gear tooth 98 formed integrally therewith and extending therefrom within a rack tooth recess 100 communicating with the slot 94 and extending radially therefrom at the transverse center of the slot 94. The stop member 96 also has a lug 102 extending radially therefrom within a notch 104 opening to the slot 94 and in diametrically opposed relation with respect to the rack tooth recess 100.

When the tooth 98 is in mesh with the rack tooth recess 100 and the lug 102 is in engagement with the slot 104, the adjustment screw 36 will have been calibrated and the disc 88 may be secured thereto in fixed relation with respect to the adjustment screw. The disc 88 has an actuator arm 106 extending radially therefrom having a depending outer end portion 108 adapted to be connected with a control knob or a slidably movable control at the dashboard (not shown) through a Bowden wire or the like, to load the adjustment arm 38 in accordance with the "desired" in-car temperature. When the disc 88 is initially adjusted after calibration of the adjustment screw 38, to attain a selected or desired temperature, the disc will turn in a clockwise or counterclockwise direction from its position shown in FIG. 4. During adjustment of the disc, the rack tooth recess 100 will pivot the stop member 96 about its axis and break off the lug 102 as the stop member 96 is moved in such a way as to position the gear tooth 98 within the slot 100. The gear tooth 98 in one of its extreme positions may move into either of two converging tooth-like ends 110 of the slot 94, depending upon the direction of turning movement of the disc 88. As illustrated in FIG. 4, the disc 88 may move 45° to either side of the center of the arcuate slot 90 to effect the required temperature adjustment period.

If it should become necessary to again calibrate the adjustmen arm, the disc 88 may be removed from the adjustment screw 36. As the arm is calibrated, the stop member 96 will be in position to register the tooth 98 with the recess or slot 100, as the disc is replaced on the adjustment screw.

Figure 2:
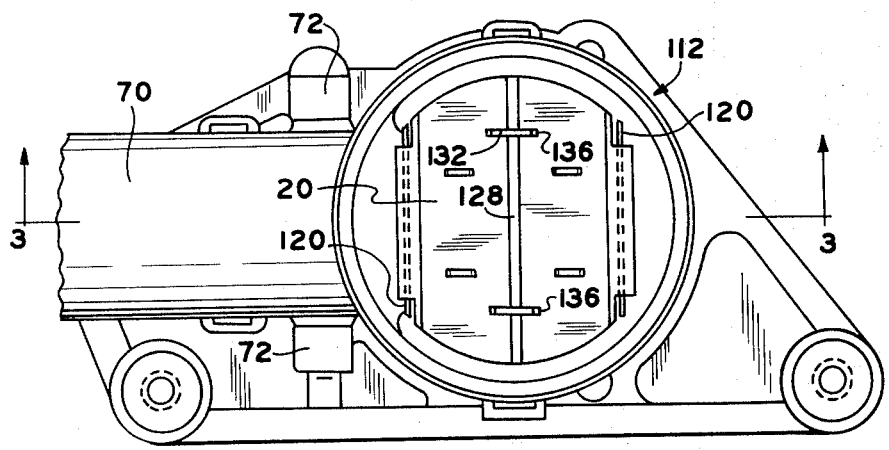
FIG. 2 is a top plan view of the vacuum modulator valve shown in FIG. 1, with the screen and cap extending over the in-car passageway into the valve housing removed.

The in-bar bimetal element 20 is of a relatively wide beam-like form extending over a major portion of the cross section of the air inlet 112, as is best shown in FIG. 2. The support for the bimetal element 20 includes a pair of aligned, parallel arms 114 extending upwardly from the top surface of the casing 30 adjacent opposite sides thereof and forming a mounting for a generally upwardly facing U-shaped saddle or yoke 116. The yoke is mounted at its base on the tops of the arms 114, as by machine screws 118 (shown schematically) extending through the base of the saddle and threaded into the arms 114. The saddle 116 has relatively wide parallel spaced legs 120 extending upwardly from its base. The legs 120 are relatively wide and have widened upwardly opening recessed portions 122, the top surfaces of the portions 122 forming knife edge supports for opposite sides of the bimetal element 20. As shown in FIG. 3, opposite sides of the bimetal element 20 are pressed upwardly to form downwardly-opening V-shaped recesses 124 engaging the knife edge supports between the margins of the recess portions 122 of the upright legs 120.

The in-car bimetal element 20 also has an upwardly opening downwardly pressed generally V-shaped central recess portion 126 extending thereacross, the apex of which conforms to engage a transverse pin 128. The pin is carried inwardly of its opposite ends, in generally triangular openings 130 in upright legs 132 of an upwardly-opening saddle 134. The legs 132 freely extend through slots 136 in the bimetal element 20. The openings 130 in the upright legs 132 have apices at the tops thereof generally conforming to the form of the pin 128 and forming bearing surfaces for pin 128, to accommodate a limited amount of relative movement of the saddle 134 with respect to the pin 128 and the adjustment arm 38. The bimetal element 20 is also shown as being slightly bowed in an upward direction on each side of the pin 128, when the element is in a normal condition, with the bowed portions extending from opposite sides of the V-shaped recess 126 to the downwardly opening recessed portions 124. The base of the yoke 134 is shown in FIG. 3 as being generally channel-like in shape and is mounted at its center on the actuator pin 74, to raise and lower the pin 74 independently of the adjustment arm 38 upon changes in temperature conditions, requiring either heating or cooling.

The yoke 116, and upright legs 120, as well as the yoke 134 and its upright legs 132 are preferably made from a stainless steel of the same thickness as the thickness of the bimetal element 20 to avoid the transfer of heat within the sensor from the supports of the bimetal element to the element itself. The bimetal element 20 with the two upwardly bowed sides is shown as being of a beam-like form and is also of a minimum thickness for quick response to temperature changes. For example, the thickness of the bimetal element 20 may be from 0.005 to 0.006 inch while the upright legs 120 and 132 may be substantially the same thickness.

Figure 7:
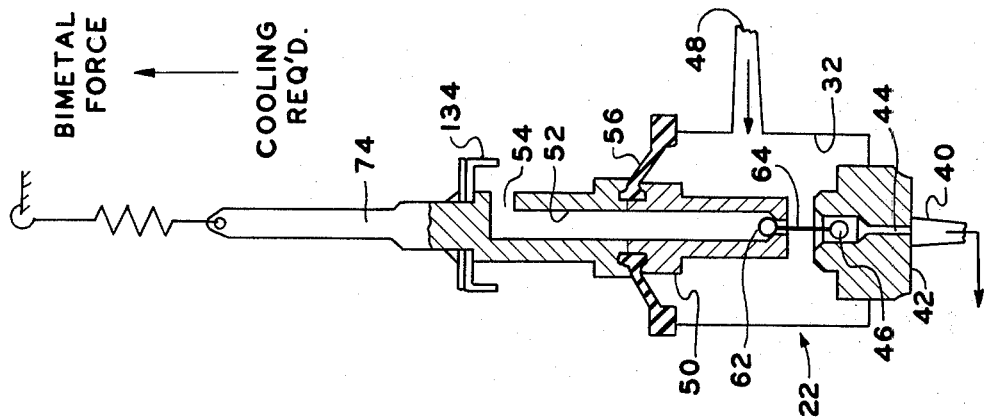
FIGS. 5, 6, and 7 are diagrammatic views showing the vacuum control valve in its various operating conditions.
Figure 6:
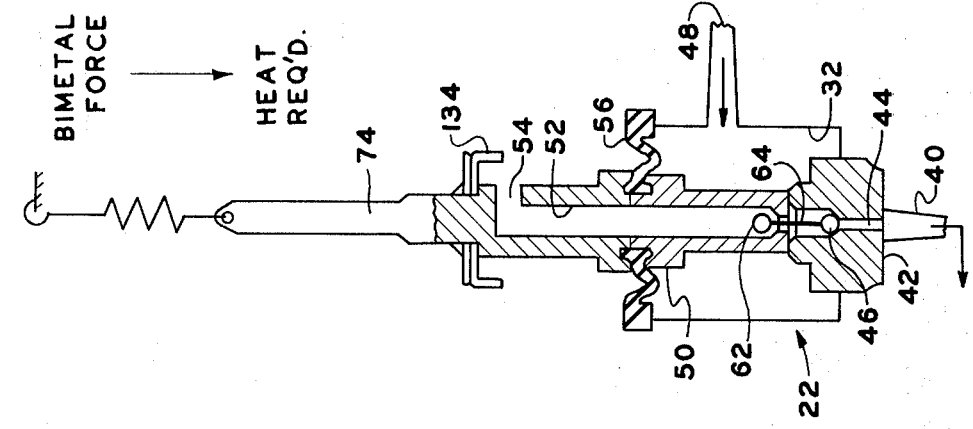
Figure 5:
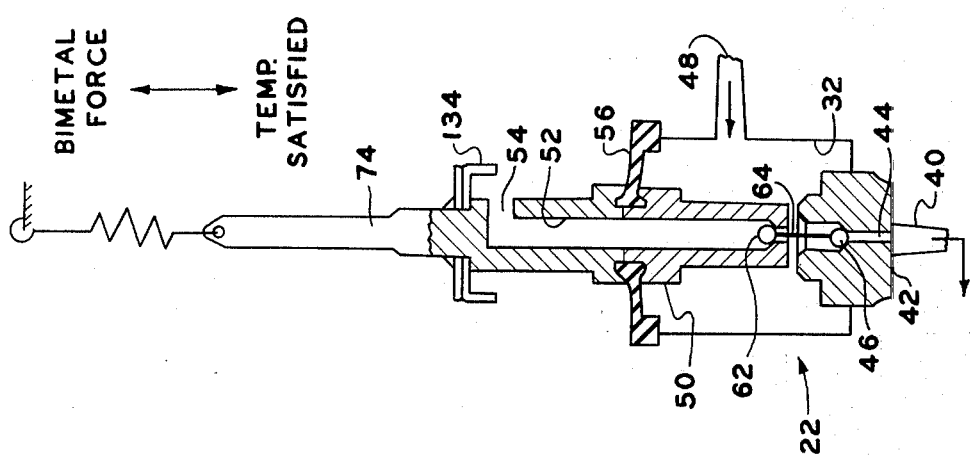

Referring now to FIGS. 5, 6, and 7 of the drawings, showing the vacuum control valve in its various positions for maintaining a predetermined temperature within the passenger compartment of the vehicle, as well as the positions requiring heating or cooling to bring the compartment to the required temperature, in FIG. 5 it will be assumed that the vacuum supplied to the vacuum motor 24 is such as to move the air blend door 26 into position to attain a selected temperature for the interior of the car. In this condition the vacuum control valve 46 and air vent valve 62 are in balanced condition and are both closed. The bimetal force of the element 20 and the force of the adjustment arm 38 thus balance the vacuum in the vacuum chamber 32. The air blend door 26 will stay in its selected position until temperature conditions again require a change in position of the door.

When the car cools down to the extend that heat is required, the force of the adjustment arm 38 and the bimetal element 20 act to open the air vent valve 62 and accommodate closing of the vacuum valve 46 and vent the chamber 32 to the atmosphere. When cooling is required, the bimetal force of the element 20 and the force of the arm 38 will act on the pin 74 in a direction to close the air vent valve 62 and open the vacuum valve 46 and connect the vacuum chamber 32 to a source of vacuum until a condition is reached where the required vacuum in the vacuum chamber 32 acting on the diaphragm 56 balances the forces acting on the system and the vacuum in the vacuum motor 24 will be sufficient to hold the air blend door 26 in a selected position.

It will be clear from the foregoing that when the vacuum motor 24 is supplied with sufficient vacuum to maintain the air blend door 26 in a desired position, the forces will balance the vacuum in the vacuum chamber 32, acting on the diaphragm 56, and it will remain balanced until a temperature condition is reached where the pssenger compartment requires either heating or cooling, at which time the forces will be unbalanced until the required temperature is reached. The forces will then balance the vacuum in the vacuum chamber and remain in this balanced condition as long as the temperature in the compartment remains substantially at the preselected constant value.

The bimetal element thus provides a temperature responsive force acting to attain a balanced vacuum and a balance condition of the valves 62 and 46 in the vacuum chamber 32 while the adjustment screw 36 preloading the adjustment arm 38 provides a second force assuring the balancing of the vacuum and the valves 62 and 46 to maintain nearly the preselected temperature condition.

The invention has been described in detail sufficient to enable one of ordinary skill in the art to make and use the same. Obviously, modifications and alterations will occur to others upon a reading of the specification and it is my intention to include all such modifications and alterations as part of my invention insofar as they come within the scope of the appended claims.

I claim:

1. A temperature-responsive vacuum modulator valve adapted for vehicle heating and air conditioning systems, comprising:
   a. a valve casing having a vacuum chamber therein;
   b. a vacuum supply line connecting said vacuum chamber to a source of vacuum;
   c. a vacuum control line spaced along said chamber from said supply line;
   d. a valve seat in said chamber between said supply line and said vacuum control line;
   e. an air vent member extending into said vacuum chamber and having an air vent chamber therein;
   f. a flexible diaphragm sealing said vacuum chamber along its periphery and being in sealing engagement with said air vent member and being capable of moving said air vent member inwardly along said vacuum chamber upon increases in vacuum;
   g. said air vent member having a control member extending outwardly therefrom and an air inlet on the outside of said vacuum chamber leading into said air vent chamber;
   h. a valve seat in said air vent chamber in axial alignment with said valve seat in said vacuum chamber;
   i. air vent and vacuum control valves respectively seated on said air vent valve seat and said vacuum valve seat and connected for conjoint movement; and
   j. means for balancing vacuum in said vacuum chamber and effecting closing of said air vent and said vacuum control valves in accordance with temperature conditions within the vehicle, said balancing means comprising:
      i. a bimetal element mounted on said casing in the flow of air at in-car temperatures and supported in spaced relation with respect to said casing and having control connection with said control member,
      ii. an adjustment arm pivotally mounted with respect to said casing having, at one end thereof, bearing engagement with said control member and, at the other end thereof, being in bearing engagement with an adjustable biasing means, and
      iii. said bimetal element and said adjustment arm having independent, operative association with said control member to effect movement of said air vent member along said vacuum chamber to balance the forces acting on said diaphragm in response to actual and desired in-car temperature conditions.

2. The vacuum modulator valve of claim 1 wherein said balancing means includes a housing associated with said valve casing, said housing having an inlet and an outlet and being adapted to permit the flow therethrough of air at in-car temperatures.

3. The vacuum modulator valve of claim 2 including support means for fixedly mounting said bimetal element with respect to said valve casing and in spaced apart relation thereto.

4. The vacuum modulator valve of claim 1 wherein said adjustable biasing means includes a threaded member threadedly carried by said valve casing.

5. The vacuum modulator valve of claim 2 wherein said bimetal element has a support means in said housing comprising a saddle having a base supported on said casing and generally parallel upright legs extending vertically from said valve casing, forming knife edge supports for opposite ends of said bimetal element.

6. Apparatus for controlling a vacuum motor to regulate the position of an air blend door in an automotive air conditioning system, comprising:
   a. a sensor having a housing defining an inlet and an outlet and adapted to permit a flow therethrough of air at in-car temperatures;
   b. an aspirator, spaced apart from said sensor, having an inlet for primary air and an inlet for aspirated air, said aspirated air inlet being in fluid communication with the outlet of said sensor;
   c. said sensor further comprising:
      i. a valve casing associated with said sensor housing and having a vacuum chamber therein,
      ii. a vacuum supply line connecting said vacuum chamber to a source of vacuum,
      iii. a vacuum control line spaced along said chamber from said supply line,
      iv. a valve seat in said chamber between said supply line and said vacuum control line,
      v. an air vent member extending into said vacuum chamber and having an air vent chamber therein,
      vi. a flexible diaphragm sealing said vacuum chamber along its periphery and being in sealing engagement with said air vent member and being capable of moving said air vent member inwardly along said vacuum chamber upon increases in vacuum,
      vii. said air vent member having a control member extending outwardly therefrom and an air inlet on the outside of said vacuum chamber leading into said air vent chamber,
      viii. a valve seat in said air vent chamber in axial alignment with said valve seat in said vacuum chamber,
      ix. air vent and vacuum control valves respectively seated on said air vent valve seat and said vacuum valve seat and connected for conjoint movement,
      x. at least one bimetal element mounted within said sensor housing in the flow of air at incar temperature and supported in spaced relation with respect to said valve casing, said control member being controllably connected to said bimetal element, and
      xi. an adjustment arm pivotally mounted within said sensor housing, one end of said arm biasing said control member in a direction tending to seat said vacuum control valve in said vacuum valve seat, said bimetal element and said adjustment arm being independent of each other and in operative association with said control member to effect movement of said air vent member along said vacuum chamber to balance the forces acting on said diaphragm in response to actual and desired in-car temperature conditions.

7. A temperature control sensor for an automotive air conditioning system for controlling the temperature of the in-car air, and in combination with an air blend door, a vacuum motor for regulating the position of the air blend door and, the flow of air into the passenger compartment, and an aspirator having an inlet for primary air and an inlet for aspirated air, said temperature control sensor comprising:
   a. a housing spaced apart from the aspirator, defining an inlet and an outlet, and being adapted to permit in-car air to flow therethrough;
   b. a valve casing associated with said sensor housing and having a vacuum chamber therein;
   c. a vacuum supply line connecting a vacuum chamber to a source of vacuum;
   d. a vacuum control line spaced along said chamber from said supply line and operatively connected to the vacuum motor;
   e. valve means within said valve casing, said vacuum supply line and said vacuum control line being in open communication when said valve means is opened, said valve means having control means extending out of said valve casing and being capable of opening and closing in response to movement of said control means, respectively, out of and into said valve casing;
   f. a bimetal element movably mounted within said housing in the flow of air at in-car temperatures, said control means being controllably connected to said bimetal element; and
   g. an adjustment arm pivotally mounted within said housing, one end of said arm biasing said control means in a direction tending to close said valve means, said bimetal element and said adjustment arm being independent of each other and in operative association with said control means to effect movement of said valve means in response to changes in the actual and desired in-car temperature conditions.

* * * * *